United States Patent
McElhinney et al.

(10) Patent No.: US 8,947,094 B2
(45) Date of Patent: Feb. 3, 2015

(54) AT-BIT MAGNETIC RANGING AND SURVEYING

(75) Inventors: Graham A. McElhinney, Aberdeenshire (GB); Leon Ceh, Calgary (CA); Kenneth Stenerson, St. Albert (CA); Euan Forbes, Calgary (CA)

(73) Assignee: Schlumber Technology Corporation, Sugar Land, TX (US)

( * ) Notice: Subject to any disclaimer, the term of this patent is extended or adjusted under 35 U.S.C. 154(b) by 264 days.

(21) Appl. No.: 13/542,476

(22) Filed: Jul. 5, 2012

(65) Prior Publication Data

US 2013/0069655 A1    Mar. 21, 2013

Related U.S. Application Data

(60) Provisional application No. 61/508,732, filed on Jul. 18, 2011.

(51) Int. Cl.
  *G01V 3/26* (2006.01)
  *E21B 47/022* (2012.01)

(52) U.S. Cl.
  CPC ............ *G01V 3/26* (2013.01); *E21B 47/02216* (2013.01)
  USPC ............................................ 324/346; 175/45

(58) Field of Classification Search
  USPC ..................... 324/346, 326; 175/45
  See application file for complete search history.

(56) References Cited

U.S. PATENT DOCUMENTS

| | | | | |
|---|---|---|---|---|
| 3,701,007 | A | * | 10/1972 | Schad ........................... 324/247 |
| 4,649,349 | A | * | 3/1987 | Chiron et al. .................. 324/346 |
| 4,933,640 | A | | 6/1990 | Kuckes |
| 5,258,755 | A | * | 11/1993 | Kuckes ....................... 340/853.5 |
| 6,321,456 | B1 | * | 11/2001 | McElhinnney .................. 33/313 |
| 6,985,814 | B2 | | 1/2006 | McElhinney |
| 7,538,650 | B2 | | 5/2009 | Stenerson et al. |
| 7,617,049 | B2 | | 11/2009 | McElhinney et al. |
| 7,656,161 | B2 | | 2/2010 | McElhinney |
| 7,712,519 | B2 | | 5/2010 | McElhinney et al. |
| 7,816,922 | B2 | | 10/2010 | McElhinney |
| 2009/0201026 | A1 | | 8/2009 | McElhinney |
| 2013/0002257 | A1 | | 1/2013 | McElhinney et al. |

FOREIGN PATENT DOCUMENTS

| | | |
|---|---|---|
| EP | 682269 A2 | 11/1995 |
| EP | 793000 A2 | 9/1997 |
| GB | 2247477 A | 3/1992 |
| GB | 2280462 A | 2/1995 |
| GB | 2280463 A | 2/1995 |

* cited by examiner

*Primary Examiner* — Jay Patidar
(74) *Attorney, Agent, or Firm* — Kimberly Ballew

(57) ABSTRACT

A bottom hole assembly configured for a subterranean drilling operation having a drill bit; a downhole tool deployed above the drill bit, at least a portion of the downhole tool free to rotate with respect to the drill bit about a longitudinal axis of the bottom hole assembly a sensor sub deployed axially between the drill bit and the downhole tool, the sensor sub configured to rotate with the drill bit about the longitudinal axis of the bottom hole assembly and free to rotate with respect to the downhole tool about the longitudinal axis and a tri-axial magnetic field sensor deployed in the sensor sub.

11 Claims, 9 Drawing Sheets

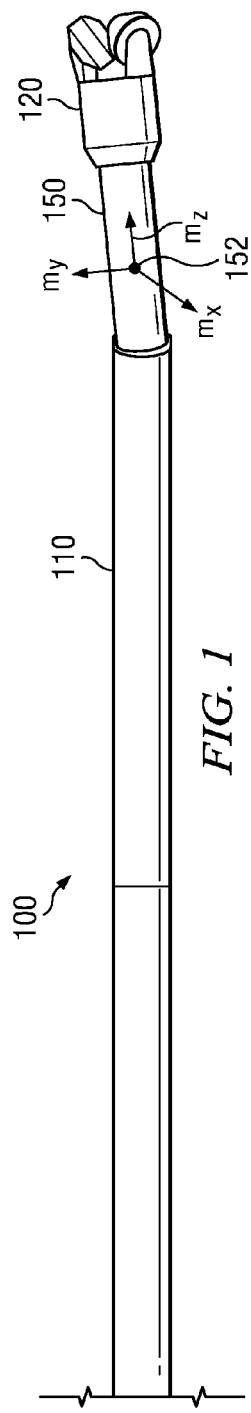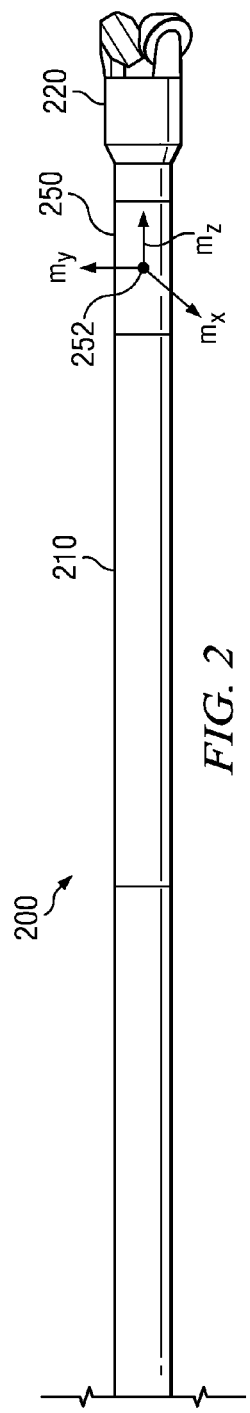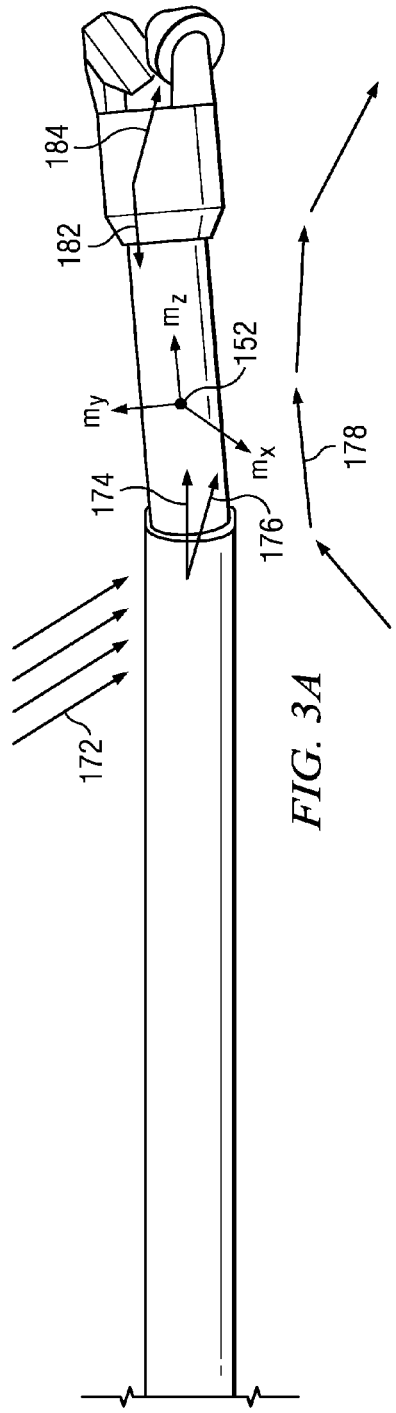

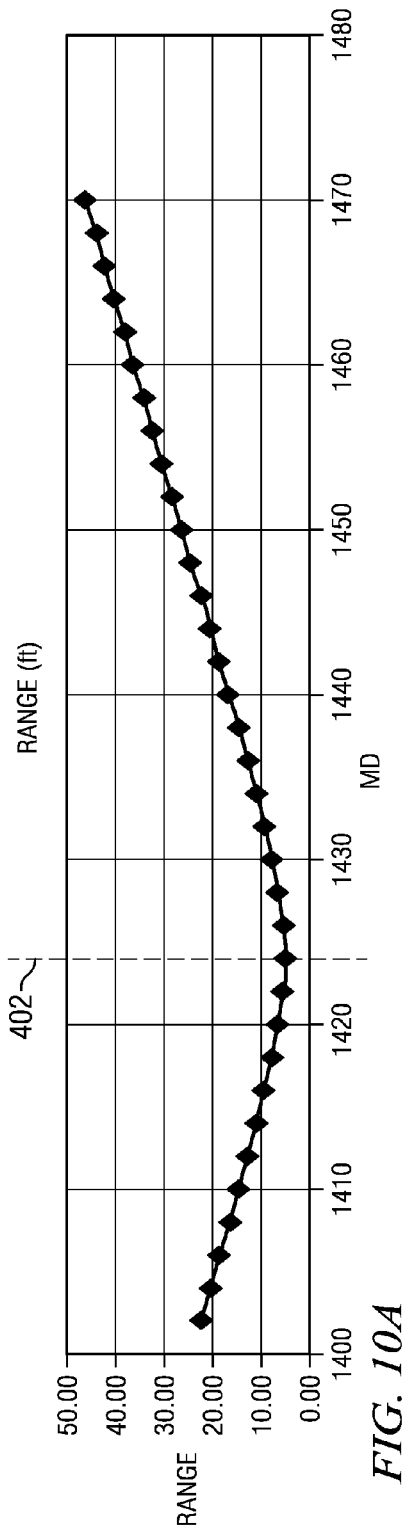
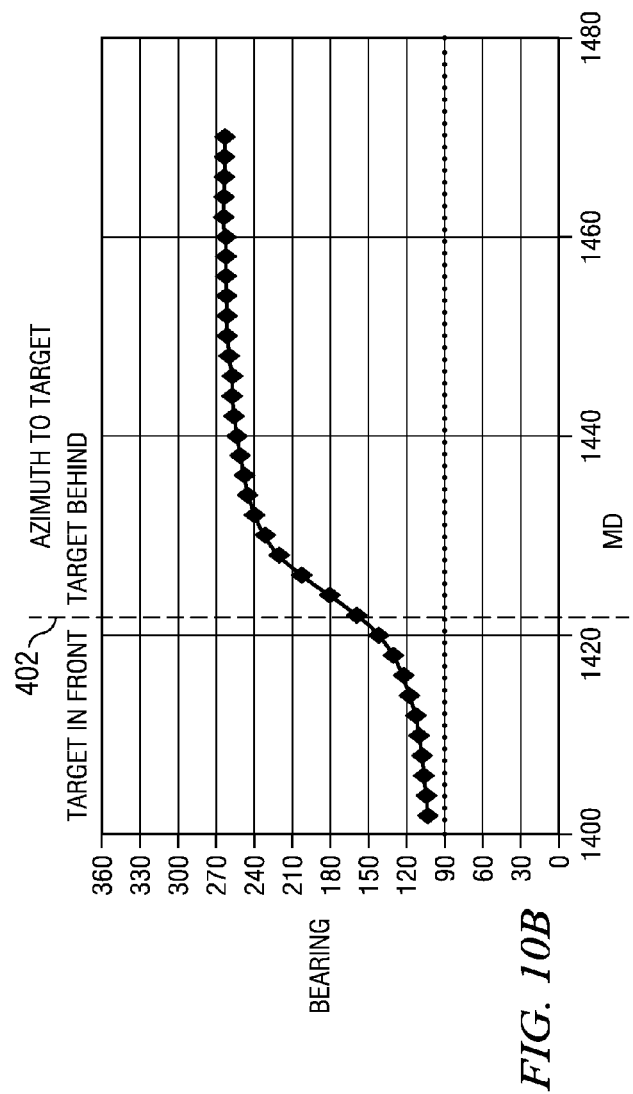
FIG. 10A
FIG. 10B

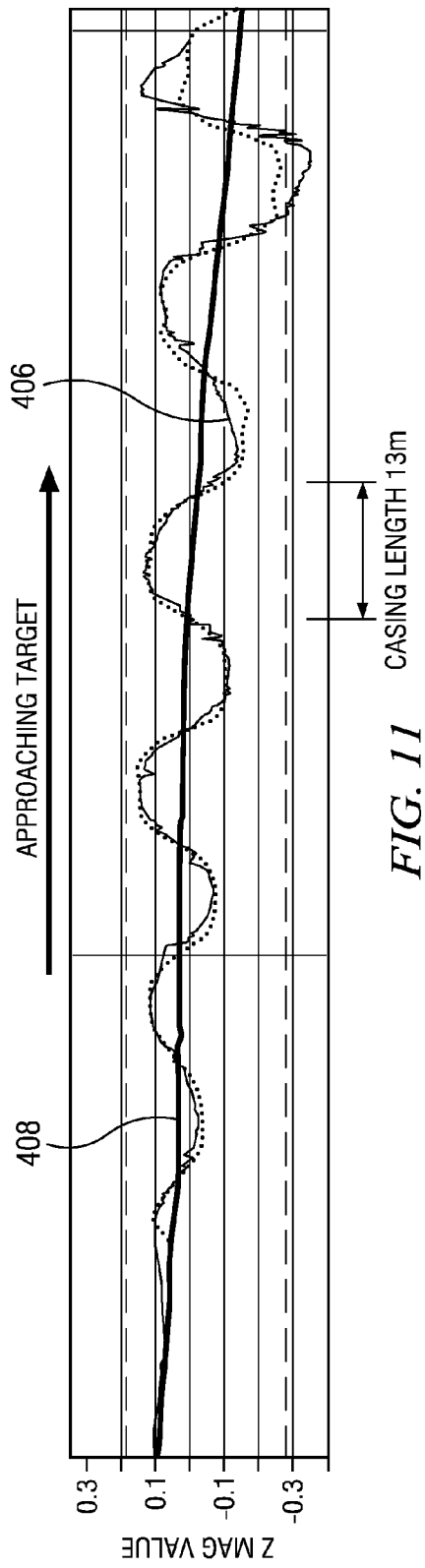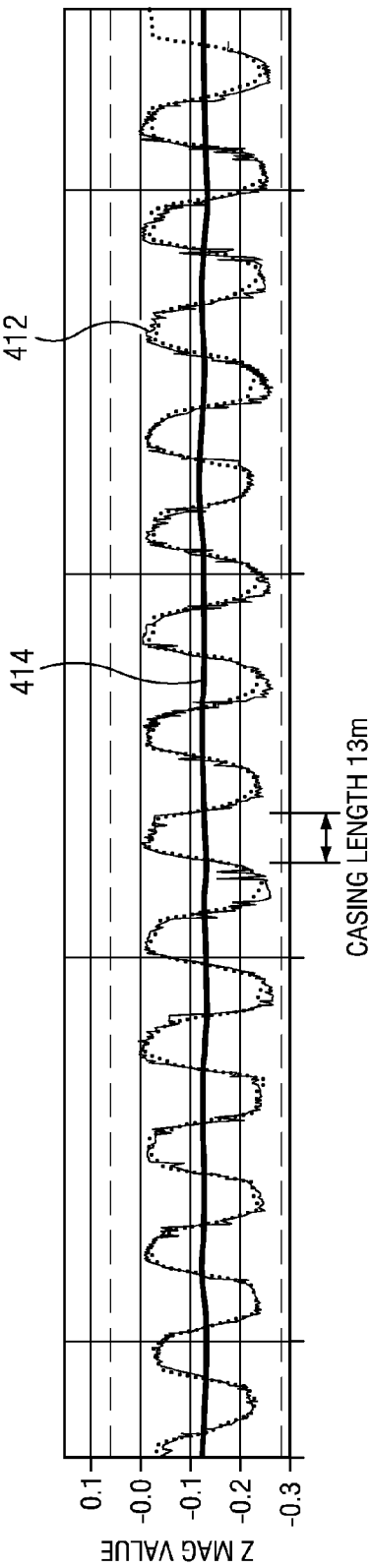

AT-BIT MAGNETIC RANGING AND SURVEYING

CROSS REFERENCE TO RELATED APPLICATIONS

This application claims the benefit of U.S. Provisional Application Ser. No. 61/508,732 entitled At-Bit Magnetic Ranging and Surveying, filed Jul. 18, 2011.

FIELD OF THE INVENTION

Disclosed embodiments relate generally to surveying subterranean wellbores used for oil and natural gas exploration and production. In particular, they relate to a method and apparatus for making near-bit or at-bit magnetic ranging and/or surveying measurements while drilling. Such ranging measurements may be utilized, for example, in twin well drilling operations such as in steam assisted gravity drainage (SAGD) and horizontal to vertical well intercept operations such as used in coal bed methane (CBM).

BACKGROUND INFORMATION

Magnetic field measurements may be used in downhole surveying operations to determine the direction of the Earth's magnetic field at a particular point (or survey station). Magnetic field measurements may also be used to locate subterranean magnetic structures, such as a nearby cased borehole. These techniques are often used, for example, in well twinning applications in which one well (the twin well) is drilled in close proximity to and often substantially parallel with another well (commonly referred to as a target well).

The magnetic techniques used to sense a target well may generally be divided into two main groups; (i) active ranging and (ii) passive ranging. In active ranging, the local subterranean environment is provided with an external magnetic field, for example, via a strong electromagnetic source in the target well. The properties of the external field are assumed to vary in a known manner with distance and direction from the source and thus in some applications may be used to determine the location of the target well. In contrast to active ranging, passive ranging techniques make use of a preexisting magnetic field emanating from magnetized components within the target borehole. In particular, conventional passive ranging techniques generally take advantage of magnetization present in the target well casing string. Such magnetization may be residual in the casing string due to magnetic particle inspection techniques that are commonly utilized to inspect the threaded ends of individual casing tubulars.

In commonly assigned U.S. Pat. No. 7,656,161 to McElhinney, a technique is disclosed in which a predetermined magnetic pattern is deliberately imparted to a plurality of casing tubulars. These tubulars, thus magnetized, are coupled together and lowered into a target well to form a magnetized section of casing string including a plurality of longitudinally spaced pairs of opposing magnetic poles. Passive ranging measurements of the magnetic field may then be utilized to survey and guide drilling of a twin well relative to the target well. The distance between the twin and target wells may be determined from various magnetic field measurements made in the twin well (as further disclosed in commonly assigned U.S. Pat. No. 7,617,049). These well twinning techniques may be utilized, for example, in steam assisted gravity drainage (SAGD) applications in which horizontal twin wells are drilled to recover heavy oil from tar sands.

While the above described method of magnetizing wellbore tubulars has been successfully utilized in well twinning applications, there is room for yet further improvement. For example, the MWD sensors used to make the magnetic ranging and magnetic surveying measurements are commonly deployed a significant distance behind the drill bit (e.g., 15 to 20 meters) in a non-magnetic section of the bottom hole assembly (BHA). Those of ordinary skill in the art will appreciate that such a deployment increases the time between cutting (drilling) and ranging at a particular location which in turn hinders an operator's ability to make timely steering decisions. In twin well drilling and intercept applications it is particularly desirable to reduce the time (latency) between cutting and ranging so that steering decisions may be made in a timely fashion thereby reducing the tortuosity of the drilling well.

One difficulty in deploying magnetic sensors at or near the drill bit is that the lower BHA is generally highly magnetic (particularly the drill bit and motor) and can therefore strongly interfere with magnetic ranging and surveying measurements. Notwithstanding such difficulties, there remains a need in the art to make at-bit or near-bit magnetic ranging measurements in various drilling operations.

SUMMARY

In one aspect, a bottom hole assembly for making at-bit ranging and surveying measurements is disclosed. The BHA includes a drill bit and a downhole tool deployed above the drill bit. At least a portion of the downhole tool is free to rotate with respect to the drill bit about a longitudinal axis of the BHA. A sensor sub is deployed axially between the drill bit and the downhole tool such that it rotates with the drill bit and is free to rotate with respect to the downhole tool. A tri-axial magnetic field sensor is deployed in the sensor sub. The magnetic field sensor is within sensory range of magnetic flux emanating from the drill bit and from the downhole tool.

In another aspect, a method for making at-bit ranging and surveying measurements is disclosed. The method includes rotating a BHA in the subterranean borehole. The BHA includes a tri-axial magnetic field sensor in sensory range of at least first and second sources of magnetic interference in the BHA, the first source being rotationally fixed to the magnetic field sensor and the second source free to rotate about a longitudinal axis of the BHA with respect to the sensor. The method further includes measuring a magnetic field with the tri-axial magnetic field sensor and removing first and second magnetic interference components from the measurement to obtain a residual magnetic field. The first magnetic interference component emanates from the first source and the second magnetic interference component emanates from the second source. The method further includes processing the residual magnetic field to determine at least one of (i) a distance and a direction to a remote magnetic source and (ii) a magnetic azimuth of the borehole.

The disclosed embodiments may provide various technical advantages. For example, disclosed embodiments provide for at or near bit magnetic surveying and ranging measurements. Such near bit measurements reduce latency (the time between formation cutting and surveying or ranging measurements at that location) and thereby may enable the well driller to make steering decisions in a time fashion. Timely steering in turn may provide for improved control of the wellbore profile and may therefore further improve placement accuracy and reduce wellbore tortuosity.

Reduced latency has many other potential benefits. For example, obtaining early survey data may enhance the ability of automated drilling systems (e.g., closed loop drilling systems or payzone steering systems) to maintain the direction of drilling along a predetermined path. Moreover, near bit deployment of the survey sensors enables accurate surveys to be obtained quickly upon exiting a casing window or casing shoe and therefore may eliminate the need for making large steering corrections at a later time.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed embodiments, and the advantages thereof, reference is now made to the following descriptions taken in conjunction with the accompanying drawings, in which:

FIG. 1 depicts a first bottom hole assembly embodiment in which magnetic field sensors are deployed substantially at the drill bit.

FIG. 2 depicts a second bottom hole assembly embodiment in which magnetic field sensors are deployed at or near the drill bit.

FIGS. 3A and 3B depict various sources of magnetic flux within sensory range of magnetic field sensors deployed substantially at the drill bit.

FIGS. 10A and 10B depict plots of range and bearing versus measured depth for the ranging operation depicted on FIG. 7.

FIG. 11 depicts a plot of the axial magnetic field component as a function of measured depth as a drilling well approaches a target well in a SAGD well twinning operation.

FIG. 12 depicts a plot of the axial component of the magnetic field as a function of measured depth as a drilling well essentially parallels a target well in a SAGD well twinning operation.

DETAILED DESCRIPTION

Figure 3B:
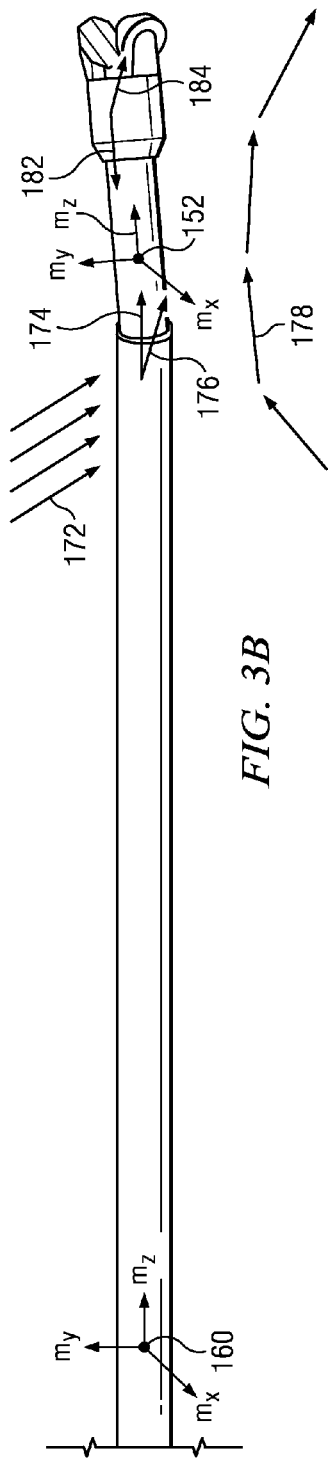

FIG. 1 depicts one example of a BHA embodiment 100 including a drilling motor 110 deployed above a bent sub 115. A sensor sub 150 including a magnetic field sensor 152 is deployed axially between the drilling motor 110 and a drill bit 120. FIG. 2 depicts an alternative BHA embodiment 200 including a sensor sub 250 including a magnetic field sensor 252 deployed axially between a steering tool 210 such as a rotary steerable tool and a drill bit 220. In the embodiments depicted on FIGS. 1 and 2, the sensor subs 150 and 250 are configured to rotate about a longitudinal axis of the BHA 100 and 200 with the drill bit 120 and 220. The magnetic sensors 152 and 252 may include substantially any magnetic sensors suitable for downhole deployment such as conventional tri-axial magnetometer deployments.

It will be understood that the embodiments depicted on FIGS. 1 and 2 are merely examples in that they depict the deployment of the magnetic field sensors substantially at the drill bit (e.g., axially between the drill bit and a mud motor). Those of ordinary skill in the art will readily conceive of other BHA configurations in which magnetic field sensors may be deployed "at-bit". While the disclosed embodiments are not strictly limited in this regard, sensors deployed "at-bit" are generally within two meters of the drill bit and may be deployed one meter or less from the drill bit. The magnetometers may even be deployed in the drill bit, e.g., in the drill bit shank. The sensors may likewise be deployed in the drilling motor 110 or the steering tool 210.

As is known to those of ordinary skill in the art, magnetic field sensors deployed "at-bit" may be subject to considerable magnetic interference, for example, from the mud motor and the drill bit. While the motor and bit may be demagnetized (degaussed) so as to prevent magnetic saturation of the sensors, such degaussing is not sufficient to eliminate the magnetic interference. In particular, demagnetizing a large and complex component such as a mud motor or a drill bit is highly problematic and inherently unreliable. As such, disclosed embodiments provide a method of accounting for the magnetic interference.

With reference now to FIGS. 3A and 3B, magnetic field sensors 152 deployed in close proximity to the drill bit may be subject to magnetic fields emanating from a number of sources, for example, including the magnetic field of the Earth 172, permanent and induced interference magnetic fields emanating from the motor 174 and 176, permanent and induced interference magnetic fields emanating from the drill bit 182 and 184, and magnetic fields emanating from an external source 178 such as an adjacent well casing (also referred to as an external interference magnetic field component). In FIG. 3B, the BHA includes a second magnetic field sensor 160 deployed uphole of the first sensor substantially out of sensory range of the magnetic interference emanating from the drill bit and the mud motor.

The deployment of a second magnetic field sensor 160 uphole and out of sensory range of magnetic interferences 174, 176, 182, and 184 may enable real-time, in-hole calibration of the lower sensor set 152. For example, in a region in which there is no external interference, the upper sensor set measures only the Earth's magnetic field 172. This enables the sum total of magnetic interferences 174, 176, 182, and 184 to be determined at any particular borehole orientation. Magnetic field measurements at multiple borehole orientations and tool face angles may further enable the magnetic interferences to be further quantified. These sources of interference and their removal are discussed in more detail below.

Measurements of the Earth's magnetic field may be made in subterranean drilling operations and are conventionally used for surveying purposes (e.g., in determining a magnetic azimuth). The magnetic field of the Earth (including the total magnetic force, magnetic declination, and magnetic inclination) is commonly known, for example, from previous geological survey data. However, for some applications it may be advantageous to measure the magnetic field in real time on site at a location substantially free from magnetic interference, e.g., at the surface of the well or in a previously drilled well. Measurement of the magnetic field in real time may be advantageous in that it accounts for time dependent variations in the Earth's magnetic field, e.g., as caused by solar winds.

However, at certain sites, such as an offshore drilling rig, measurement of the Earth's magnetic field in real time may not be practical. In such instances, it may be desirable to utilize previous geological survey data in combination with suitable interpolation and/or mathematical modeling (i.e., computer modeling) routines. Commonly invented, commonly assigned, co-pending U.S. patent application Ser. No. 13/528,527, which is fully incorporated herein by reference discloses one methodology for making real-time measurements of the Earth's magnetic field during drilling.

The magnetic field emanating from the motor may be thought of as first and second distinct magnetic fields, a first permanent magnetic field imparted into the motor during magnetic particle inspection procedures and a second induced magnetic field caused by the absorption of the Earth's field. The permanent magnetic field is essentially constant with time and fixed to the motor. By fixed to the motor it is meant that the permanent magnetic field rotates with the motor. The induced magnetic field of the motor does not rotate with the motor and only changes as the angle between the BHA and the Earth's magnetic field changes.

The magnetic field emanating from the drill bit may also be thought of as first and second distinct magnetic fields, a first permanent magnetic field imparted to the drill bit during magnetic particle inspection procedures and a second induced magnetic field caused by the absorption of the Earth's field. The permanent magnetic field is essentially constant with time and fixed to the drill bit. By fixed to the drill bit it is meant that the permanent magnetic field rotates with the drill bit, bit sub, and sensors (unlike that of the motor which rotates independent of the sensors). The induced magnetic field of the motor does not rotate with the drill bit and only changes as the angle between the drill bit and the Earth's magnetic field changes.

The magnetic fields emanating from external sources such magnetized wellbore casing are described in more detail elsewhere, for example, in commonly assigned U.S. Pat. Nos. 6,985,814; 7,538,650; 7,617,049; 7,656,161; and 7,712,519 and commonly assigned U.S. Patent Publication 2009/0201026, each of which is fully incorporated by reference herein.

Figure 4:
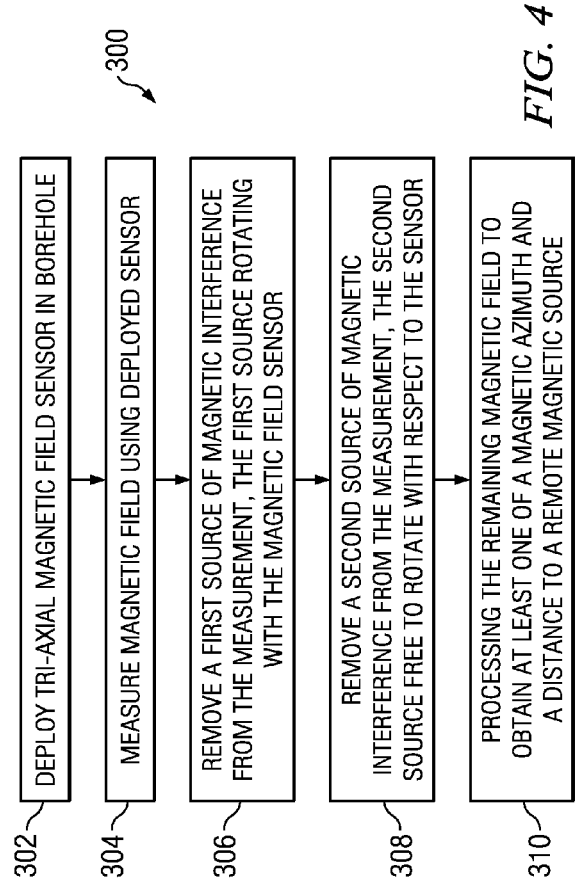
FIG. 4 depicts a flow chart of one example of a method for making at-bit magnetic ranging and/or surveying measurements.

FIG. 4 depicts a flow chart of method embodiment 300. Method 300 includes deploying a BHA (e.g., BHA 100 or BHA 200 shown on FIGS. 1 and 2) in a subterranean borehole at 302. The BHA includes a tri-axial magnetic field sensor deployed at or very near the drill bit, for example, between first and second sources of magnetic interference as described above. At 304 the deployed sensor is utilized to measure a magnetic field in the subterranean borehole. This magnetic field may be measured dynamically while drilling or statically while the BHA remains substantially stationary in the borehole (e.g., while another length of drill pipe is added to the drill string). Both dynamic and static measurements may be made during a drilling operation. At 306 and 308 at least first and second sources of magnetic interference are removed from the measurement made at 304. The first source of magnetic interference emanates from a structure that rotates with the magnetic field sensors, for example, including a drill bit as described above with respect to FIGS. 1-3. The second source of magnetic interference emanates from a structure that is free to rotate with respect to the magnetic field sensors, for example, including the stator portion of the downhole drilling motor or a blade housing in a rotary steerable tool. At 310 the remaining magnetic field (the portion remaining after removal of the first and second sources) is processed to obtain at least one of the magnetic azimuth of the borehole or a distance to a remote magnetic source such as a nearby cased wellbore.

Removal of the first and second sources of magnetic interference generally requires a determination of the interference magnetic field vectors attributable to these sources (i.e., the magnitude and direction of the interference magnetic fields). As described above the magnetic field from the first source (e.g., the drill bit) includes both permanent and induced components. Likewise, the magnetic field from the second source (e.g., the motor or the rotary steerable housing) also includes both permanent and induced components.

Figure 5:
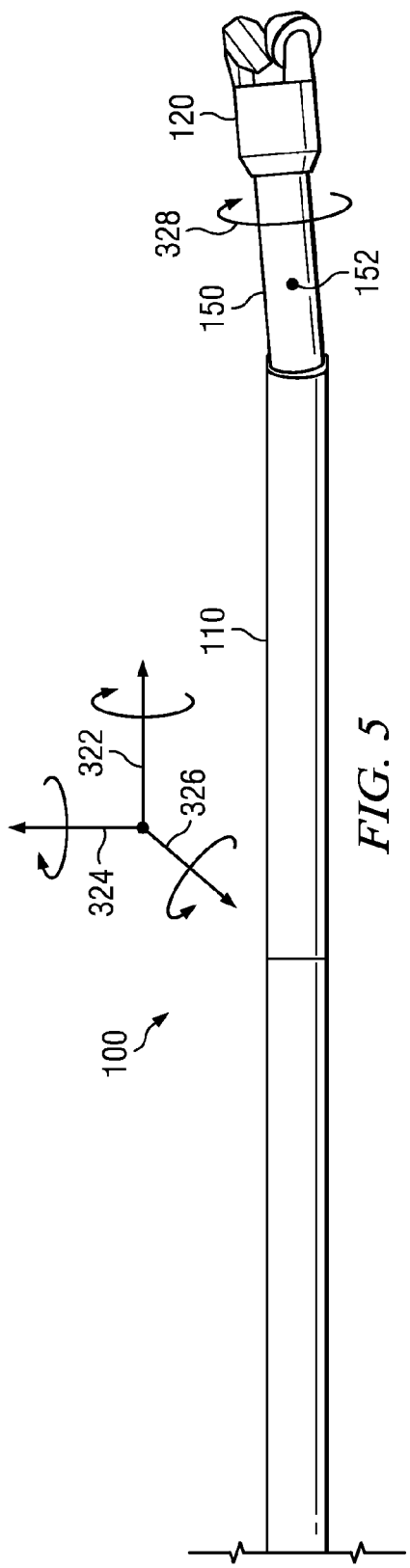
FIG. 5 depicts the BHA of FIG. 1 indicating example roll test rotational axes.

Several techniques may be utilized to determine the interference magnetic field vectors attributable to the first and second sources. For example, the BHA may be tested at the surface in a location substantially free of external magnetic interference (U.S. patent application Ser. No. 13/528,527 discloses one method for finding such a location). In one embodiment a surface roll test may be performed in which the BHA is rotated about at least one axis while the magnetic field sensor is used to make corresponding magnetic field measurements (as indicated on FIG. 5). For example, the BHA may be positioned horizontally and rotated about its longitudinal axis (axis 322 on FIG. 5). The BHA may also be rotated about a vertical axis 324 or may be rotated to various inclinations by rotating about horizontal axis 326. Furthermore, the sensor housing and the drill bit may be rotated about the longitudinal axis of the BHA with respect to the motor (or steering tool) as indicated at 328. Magnetic field measurements may be made at some angular interval (e.g., 45 degrees) during these roll tests and the results input into a multi-station analysis software package such as is commonly used in borehole surveying operations. One suitable example of a multi-station analysis methodology is disclosed in European Patent Application EP 0793000 A2. The aforementioned roll tests may also be made with partial BHA configurations, for example, a first configuration in which the drill bit is removed so as to isolate the magnetic interference components attributable to the drilling motor and a second configuration in which the drilling motor is replaced with a nonmagnetic section of drill pipe so as to isolate the magnetic interference components attributable to the drill bit.

Figure 6:
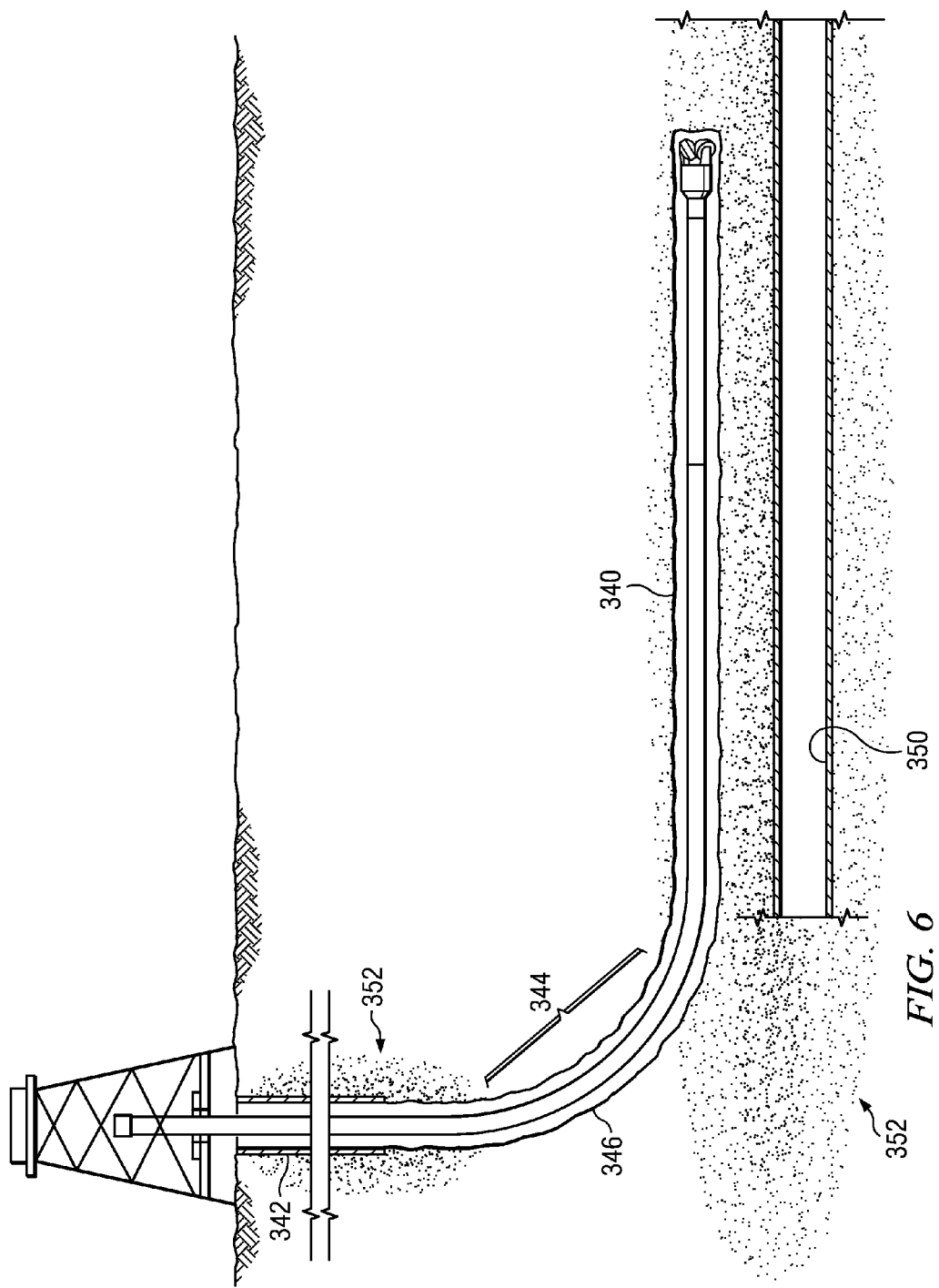
FIG. 6 depicts a portion of a SAGD well twinning operation.

Similar calibration-type measurements may also be made while the BHA is deployed downhole in a zone substantially free of magnetic interference. FIG. 6 depicts one such zone in a SAGD operation. As depicted the well being drilled 340 exits the surface (vertical) casing 342 and enters a zone free from external magnetic fields 344 in a dogleg portion 346 of the well prior to landing above the adjacent well 350. External magnetic fields from the surface casing 342 and the adjacent well 350 are shown at 352. Multiple static and dynamic magnetic field measurements may be made in the magnetic free zone and input into the aforementioned multi-station analysis software package.

Mathematical modeling routines may be utilized to determine the induced magnetic fields from the drilling motor and the drill bit. Such modeling may take into account the size, shape, structure, and materials of construction of the drilling motor and drill bit. Such modeling also takes into account the strength and direction of the Earth's magnetic field at the drilling site. Three-dimensional modeling may be utilized in combination with the aforementioned roll tests so as to separate the permanent and induced magnetic contributions. For example, Finite Element Method Magnetics (FEMM) may be utilized.

The permanent magnetic fields imparted to the drilling motor (or rotary steerable housing) and the drill bit may be considered to be substantially constant biases. Moreover, the permanent magnetic field from the drill bit is fixed (i.e., in the same coordinate system) with respect to the sensors. This magnetic field component may therefore be readily subtracted from the measured magnetic field independent of the borehole inclination and azimuth and the tool face of the sensors in the borehole. The magnetic field from the drilling motor is in a different coordinate system than the sensors due both to the presence of the bent sub and the rotational degree of freedom between the sensors and the stator. The surface calibration measurements described previously may be utilized to determine the rotationally dependent bias and correlate it with the tool face angle of the bent sub. The tool face angle of the bent sub is commonly measured during drilling and may be combined with a tool face measurement of the drill string to obtain the relative rotational angle between the magnetic field sensor and the drilling motor.

The induced magnetic field component due to the drilling motor is not affected by rotation of the BHA in the borehole (assuming a rotationally symmetrical drilling motor). The induced magnetic field component due to the drill bit is moderately affected by rotation of the BHA due to the slight change in angle between the Earth's magnetic field and the drill bit caused by rotation of the bent sub. In general, this change is rather small and may often be neglected such that to a first order approximation the induced magnetism from the drilling motor in the drill bit can be added together to create a single fixed bias. The disclosed embodiments are of course not limited in these regards.

After the magnetic interference from the BHA has been removed, the remaining magnetic field includes the Earth's magnetic field and any external interference fields. In regions in which there is little or no external magnetic interference (e.g., from nearby cased wellbores) the remaining magnetic field may be processed to compute a magnetic azimuth of the borehole. Such processing is known in the art. In regions of the borehole in which there is external magnetic interference, the Earth's magnetic field may be further subtracted from the magnetic field measurements to obtain the external magnetic interference. The external magnetic interference may then be processed, for example, to obtain a distance and/or a direction to the source of the interference (e.g., a distance and direction to a remote cased wellbores). Such processing (both the removal of the Earth's magnetic field and the determination of a distance and direction) is disclosed in commonly assigned U.S. Pat. Nos. 6,985,814; 7,617,049; 7,656,161, and 7,816,922 and U.S. Patent Publication 2009/0201026.

Magnetic measurements made at the drill bit may be particularly advantageous when utilized in subterranean drilling operations that require a perpendicular crossing (e.g., a horizontal to vertical intersection or lattice operations in which a first set of substantially horizontal well pairs are drilled substantially perpendicular to a second set of horizontal well pairs). In a horizontal to vertical crossing the vertical pilot well may be drilled first. A magnetic source (such as an electromagnet or a magnetized casing) is deployed in the pilot well and a horizontal well drilled towards the pilot. Deployment of the magnetic sensors at-bit enables the magnetic ranging measurements to be made ahead of the drill bit thereby minimizing collision risk with the target well (or maximizing the likelihood of collision in a relief well drilling operation).

Figure 7:
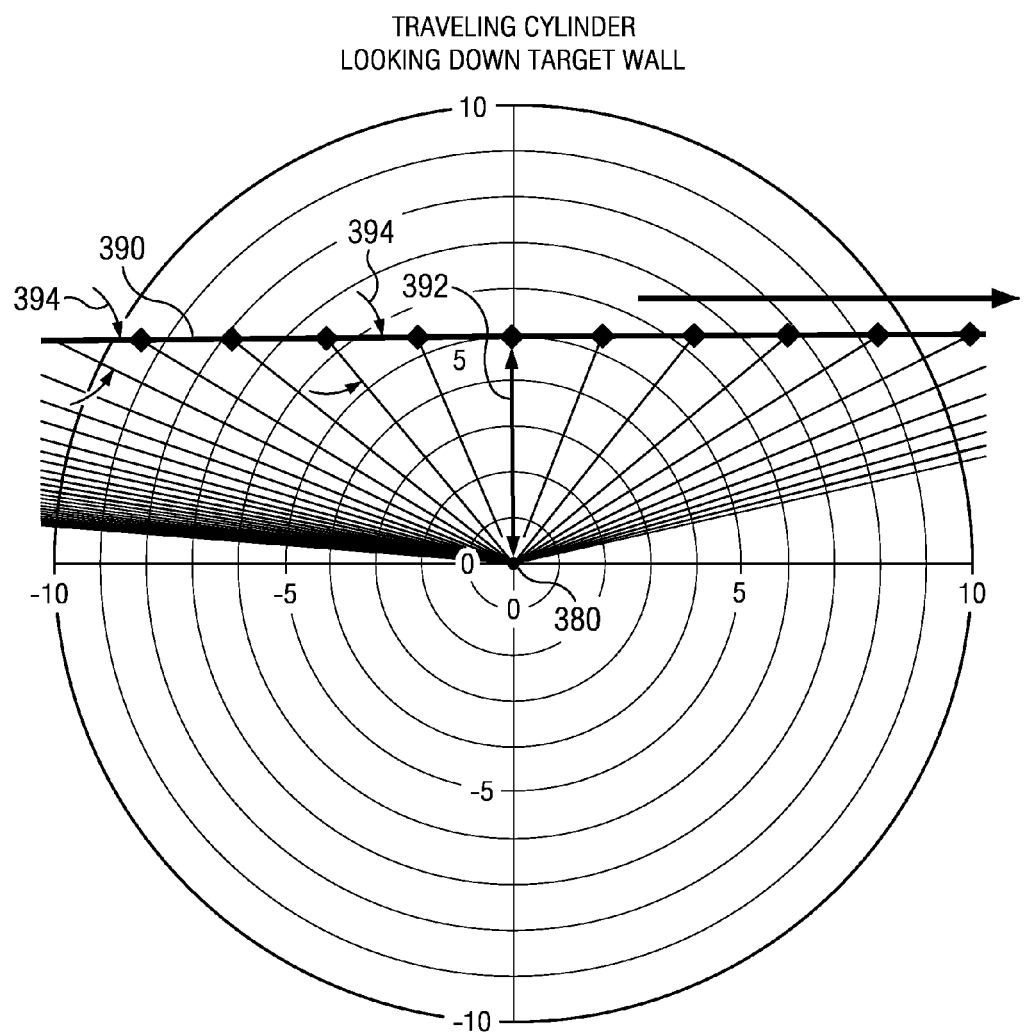
FIG. 7 depicts a traveling cylinder looking down the target well in a horizontal to vertical intercept magnetic ranging operation.

FIG. 7 depicts a traveling cylinder looking down the target well 380. In the particular embodiment depicted the drilling well 390 "intersects" the vertical target well 380 at a closest distance of 5 meters as indicated at 392. The traveling cylinder also indicates a changing "azimuthal" direction 394 between the drilling well 390 and the target well 380 as the drilling well 390 as it moves past the target 380 (the azimuth increases as the drilling well approaches and moves past the target).

Figure 8:
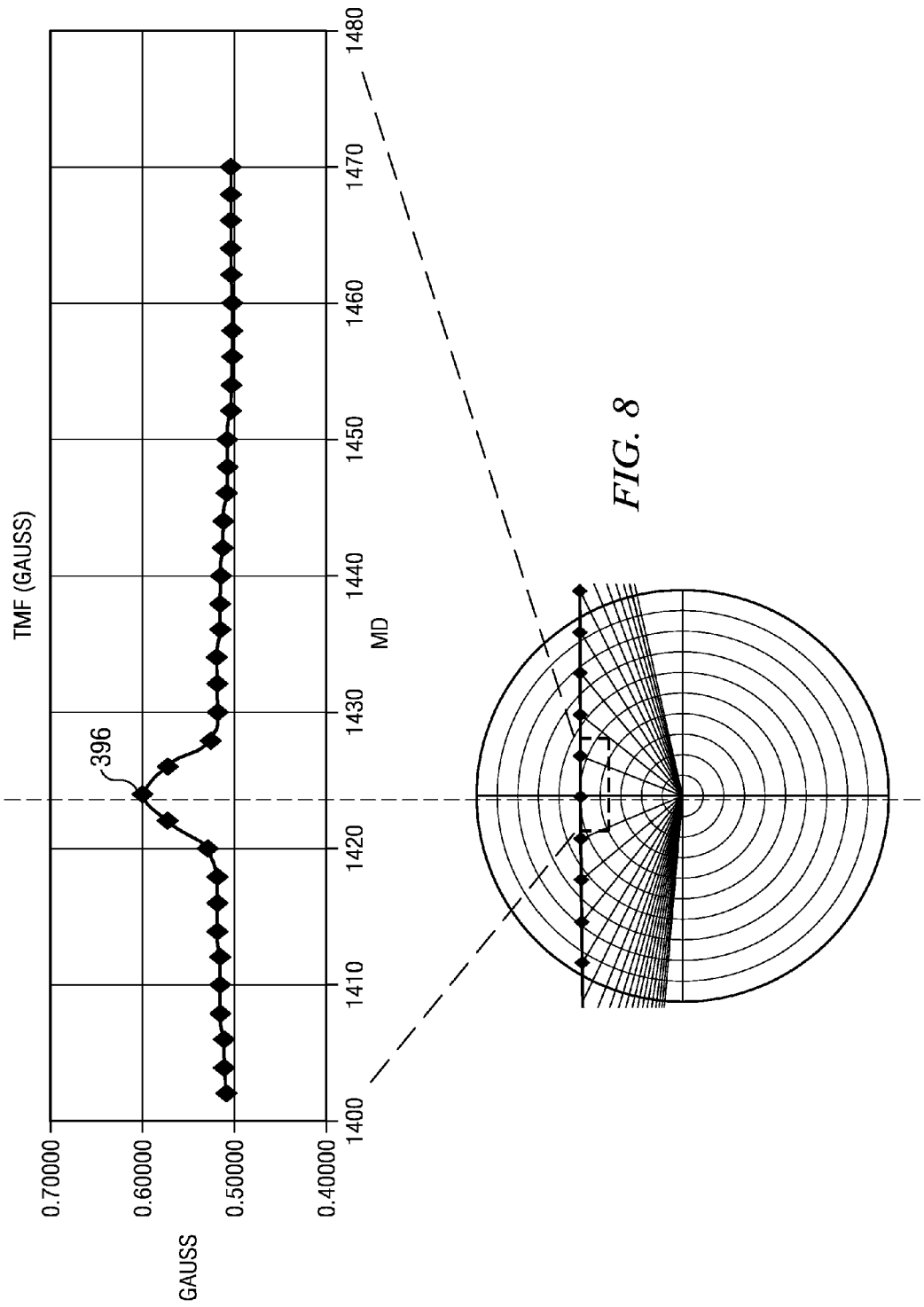
FIG. 8 depicts a plot of the total magnetic force versus measured depth for the ranging operation depicted on FIG. 7.

FIG. 8 depicts a plot of the total magnetic force TMF (i.e., the magnitude of the magnetic field) versus measured depth. As indicated at 396 a maximum value of TMF is observed when the drilling well is at a right angle to the target well (which is also the location at which the drilling well is closest to the target well).

Figure 9A:
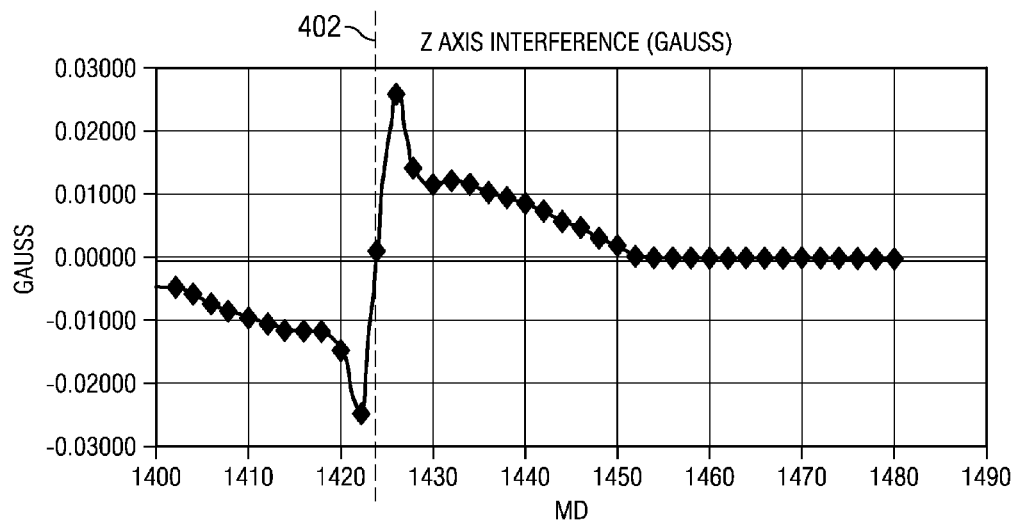
FIGS. 9A and 9B depict plots of the axial and cross-axial magnetic flux versus measured depth for the ranging operation depicted on FIG. 7.
Figure 9B:
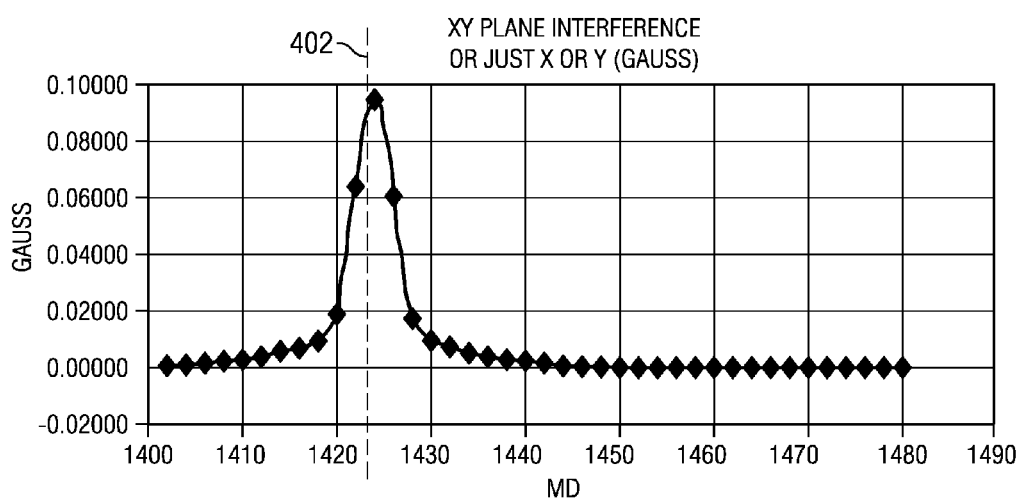

FIGS. 9A and 9B depict plots of the axial and cross-axial magnetic flux versus measured depth. It will be understood that the axial component of the magnetic field is commonly referred to as the z-axis component of the magnetic field. The cross-axial component of the magnetic field may be derived from the x- and y-axis components of the magnetic field, for example, as follows: $M_{cross}=\sqrt{M_x^2+M_y^2}$. As indicated on FIG. 9A the axial component of the magnetic field increases monotonically as the horizontal well approaches the vertical pilot well. The absolute value of the axial component reaches a maximum just prior to a closest approach 402 before decreasing sharply and changing signs (from negative to positive in the depicted embodiment) at the closest approach (such that $M_z$ passes through zero at the closest approach). The absolute value of the axial component increases sharply to a maximum and then decreases monotonically as the horizontal well moves away from the vertical pilot well. As indicated on FIG. 9B, the cross axial component of the magnetic field increases sharply to a maximum at the closest approach.

FIGS. 10A and 10B depict range (distance) and bearing (also referred to as azimuth to target) versus measured depth. As indicated with respect to FIG. 7, the distance between the drilling well and the target well decreases monotonically to a minimum at the closest approach 402 before increasing as the drilling well moves past the target. The drilling well is at a right angle (90 degrees) with respect to the target well when the distance is at a minimum. In the depicted embodiment the azimuth to target is 155 degrees at the minimum distance.

Magnetic measurements made at the drill bit may also be particularly advantageous when utilized in subterranean well twinning operations (e.g., SAGD operations) in which a section of a drilling well is intended to parallel a corresponding section of a target well. Deployment of the magnetic sensors at-bit reduces latency and thereby enables prompt steering decisions to be made. This can be particularly important when landing the drilling well on the target well.

FIG. 11 depicts a plot of the axial magnetic field component as a function of measured depth as a drilling well approaches a target well in a SAGD well twinning operation. Note that the amplitude of the axial waves 406 increases as the drilling well approaches the target well (i.e., as the distance between the drilling well in the target well decreases). This is consistent with the disclosure of commonly assigned U.S. Pat. No. 7,617,049. FIG. 11 also plots the axial component of the Earth's magnetic field 408 after removal of the external casing interference from which the magnetic azimuth of the drilling well may be determined As depicted the axial component of the Earth's magnetic field 408 is decreasing with measured depth indicating that the drilling well is turning (a change in azimuth) as it lands on the target well.

FIG. 12 depicts a plot of the axial component of the magnetic field as a function of measured depth as the drilling well essentially parallels the target well. Note that the axial waves 412 maintain a substantially uniform amplitude indicating that the range (distance) between the drilling well and the target well remains substantially constant. The range may be determined from either the axial or cross axial waves. FIG. 12 also plots the axial component of the Earth's magnetic field 414 after removal of the external casing interference from which the magnetic azimuth of the drilling well may be determined As depicted the axial component of the Earth's magnetic field remains substantially constant with measured depth indicating that the drilling well and target well are substantially straight (no change in azimuth).

While FIGS. 11 and 12 depict plots of the axial component it will be understood that the cross-axial component may also be utilized (in the depicted embodiments the cross axial component would be out of phase with the axial component by a measured depth of one-half the casing length in the target well). The cross-axial waves are at maximum and minimum values at the casing ends while the axial waves are maximum and minimum values at approximately the casing midpoints in the depicted embodiments (the disclosed embodiments are limited in these regards).

In one non-limiting embodiment a bottom hole assembly configured for a subterranean drilling operation is disclosed. The bottom hole assembly comprises a drill bit; a downhole tool deployed above the drill bit, at least a portion of the downhole tool being free to rotate with respect to the drill bit about a longitudinal axis of the bottom hole assembly; a sensor sub deployed axially between the drill bit and the downhole tool, the sensor sub being rotationally coupled with the drill bit about the longitudinal axis of the bottom hole assembly; and a magnetic field sensor deployed in the sensor sub, the magnetic field sensor within sensory range of magnetic flux emanating from the drill bit and from the downhole tool.

In another non-limiting embodiment, a method for making at bit magnetic ranging measurements in a subterranean borehole is disclosed. The method comprises (a) rotating a bottom hole assembly in the subterranean borehole, the bottom hole assembly including a magnetic field sensor in sensory range of at least first and second sources of bottom hole assembly magnetic interference, the first source being rotationally coupled to the magnetic field sensor and the second source free to rotate about a longitudinal axis of the bottom hole assembly with respect to the magnetic field sensor; (b) measuring a magnetic field with the magnetic field sensor; (c) removing first and second magnetic interference components from the measurement made in (b) to obtain a residual magnetic field, the first magnetic interference component emanating from the first source and the second magnetic interference component emanating from the second source; and (d) processing the residual magnetic field obtained in (c) to determine at least one of a distance and a direction to a remote magnetic source.

In a further non-limiting embodiment, a method for making at bit magnetic surveying measurements in a subterranean borehole is disclosed. The method comprises: (a) rotating a bottom hole assembly in the subterranean borehole, the bottom hole assembly including a magnetic field sensor in sensory range of at least first and second sources of bottom hole assembly magnetic interference, the first source being rotationally coupled to the magnetic field sensor and the second source free to rotate about a longitudinal axis of the bottom hole assembly with respect to the magnetic field sensor; (b) measuring a magnetic field with the magnetic field sensor; (c) removing first and second magnetic interference components from the measurement made in (b) to obtain a residual magnetic field, the first magnetic interference component emanating from the first source and the second magnetic interference component emanating from the second source; and (d) processing the residual magnetic field obtained in (c) to determine a magnetic azimuth of the subterranean borehole.

Although at-bit magnetic ranging and surveying and its advantages have been described in detail, it should be understood that various changes, substitutions and alternations can be made herein without departing from the spirit and scope of the disclosure as defined by the appended claims.

We claim:

1. A method for making at bit magnetic ranging measurements in a subterranean borehole, the method comprising:
   (a) rotating a bottom hole assembly in the subterranean borehole, the bottom hole assembly including a magnetic field sensor in sensory range of at least first and second sources of bottom hole assembly magnetic interference, the first source being rotationally coupled to the magnetic field sensor and the second source free to rotate about a longitudinal axis of the bottom hole assembly with respect to the magnetic field sensor;
   (b) measuring a magnetic field with the magnetic field sensor;
   (c) removing first and second magnetic interference components from the measurement made in (b) to obtain a residual magnetic field, the first magnetic interference component emanating from the first source and the second magnetic interference component emanating from the second source; and
   (d) processing the residual magnetic field obtained in (c) to determine at least one of a distance and a direction to a remote magnetic source.

2. The method of claim 1, wherein the magnetic field sensor comprises a tri-axial magnetic field sensor, one axis of which is substantially parallel with the longitudinal axis of the bottom hole assembly.

3. The method of claim 1, wherein the first source is a drill bit.

4. The method of claim 1, wherein the second source is at least one of a drilling motor and a rotary steerable tool.

5. The method of claim 1, wherein each of the first and second magnetic interference components further comprises a permanent magnetic field component and an induced magnetic field component.

6. The method of claim 1, wherein (d) further comprises:
   (i) removing Earth's magnetic field from the residual magnetic field to obtain an external interference magnetic field;
   (ii) processing the external interference magnetic field obtained in (i) to determine at least one of a distance and a direction to the remote magnetic source.

7. A method for making at bit magnetic surveying measurements in a subterranean borehole, the method comprising:
   (a) rotating a bottom hole assembly in the subterranean borehole, the bottom hole assembly including a magnetic field sensor in sensory range of at least first and second sources of bottom hole assembly magnetic interference, the first source being rotationally coupled to the magnetic field sensor and the second source free to rotate about a longitudinal axis of the bottom hole assembly with respect to the magnetic field sensor;
   (b) measuring a magnetic field with the magnetic field sensor;
   (c) removing first and second magnetic interference components from the measurement made in (b) to obtain a residual magnetic field, the first magnetic interference component emanating from the first source and the second magnetic interference component emanating from the second source; and (d) processing the residual magnetic field obtained in (c) to determine a magnetic azimuth of the subterranean borehole.

8. The method of claim 7, wherein the magnetic field sensor comprises a tri-axial magnetic field sensor, one axis of which is substantially parallel with the longitudinal axis of the bottom hole assembly.

9. The method of claim 7, wherein the first source is a drill bit.

10. The method of claim 7, wherein the second source is at least one of a drilling motor and a rotary steerable tool.

11. The method of claim 7, wherein each of the first and second magnetic interference components further comprises a permanent magnetic field component and an induced magnetic field component.

* * * * *